US010103879B2

(12) United States Patent
Chen et al.

(10) Patent No.: US 10,103,879 B2
(45) Date of Patent: Oct. 16, 2018

(54) SECURE DATA UPLOAD/DOWNLOAD SERVICE

(71) Applicant: Verizon Patent and Licensing Inc., Arlington, VA (US)

(72) Inventors: Zhong Chen, Acton, MA (US); Fenglin Yin, Lexington, MA (US); Jianxiu Hao, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 209 days.

(21) Appl. No.: 14/870,329

(22) Filed: Sep. 30, 2015

(65) Prior Publication Data

US 2017/0093815 A1   Mar. 30, 2017

(51) Int. Cl.
*H04L 29/06* (2006.01)
*H04L 9/08* (2006.01)
*H04L 29/08* (2006.01)

(52) U.S. Cl.
CPC .......... *H04L 9/0825* (2013.01); *H04L 9/0841* (2013.01); *H04L 63/0281* (2013.01); *H04L 63/0428* (2013.01); *H04L 63/06* (2013.01); *H04L 67/02* (2013.01); *H04L 67/141* (2013.01)

(58) Field of Classification Search
CPC ....... H04L 67/141; H04L 67/02; H04L 67/10; H04L 67/28; H04L 63/0281; H04L 63/0435; H04L 63/0442; H04L 63/0876; H04L 45/74; H04L 45/745
See application file for complete search history.

(56) References Cited

U.S. PATENT DOCUMENTS

| 6,510,464 | B1* | 1/2003 | Grantges, Jr. ..... H04L 29/12594 709/224 |
| 7,512,973 | B1* | 3/2009 | Chan ....................... H04L 63/10 380/272 |
| 7,636,764 | B1* | 12/2009 | Fein .................... H04L 67/1097 709/201 |
| 8,812,579 | B2* | 8/2014 | Rivera ................ H04L 63/0227 705/38 |
| 9,172,679 | B1* | 10/2015 | Geddes ............... H04L 63/0281 |
| 9,356,882 | B2* | 5/2016 | Burns ..................... G06F 3/122 |
| 2004/0243680 | A1* | 12/2004 | Mayer ..................... G06F 9/545 709/206 |
| 2008/0155067 | A1* | 6/2008 | Rivera ................ H04L 63/0227 709/220 |
| 2012/0005719 | A1* | 1/2012 | McDougal ............ G06F 21/562 726/1 |

(Continued)

*Primary Examiner* — Tae K Kim

(57) ABSTRACT

A first device may receive data, to be provided to a second device, and an application identifier. The data and application identifier may be received from a third device. The first device may be associated with a first network, and the second device may be associated with a second network. The first network may be a different network than the second network. The application identifier may be associated with the second device. The first device may determine that the data is destined to the second device based on the application identifier. The first device may cause a secure session to be established with the second device. The secure session may allow the data to be securely transmitted from the third device to the second device. The first device may provide the data to the second device via the secure session.

20 Claims, 10 Drawing Sheets

(56) References Cited

U.S. PATENT DOCUMENTS

| | | | |
|---|---|---|---|
| 2012/0158829 A1* | 6/2012 | Ahmavaara | H04L 63/101 709/203 |
| 2012/0158973 A1* | 6/2012 | Jacobson | H04L 29/12613 709/227 |
| 2012/0198520 A1* | 8/2012 | Cha | H04L 63/20 726/3 |
| 2012/0324110 A1* | 12/2012 | Kohli | H04L 63/0281 709/226 |
| 2013/0204838 A1* | 8/2013 | Gould | H04L 41/5041 707/609 |
| 2013/0265940 A1* | 10/2013 | Su | H04L 67/2861 370/328 |
| 2016/0014154 A1* | 1/2016 | Huang | H04L 63/20 726/1 |
| 2016/0119343 A1* | 4/2016 | Salmela | H04W 12/04 726/7 |
| 2016/0315923 A1* | 10/2016 | Riscombe-Burton | H04L 63/0281 |

\* cited by examiner

SECURE DATA UPLOAD/DOWNLOAD SERVICE

BACKGROUND

An application that is running on user equipment (a UE) may provide data to an application device via a cellular network (e.g., a long term evolution (LTE) network, a third generation (3G) network, a fourth generation (4G) network, etc.). In some cases, the UE may provide the data to the application device via a secure session. For example, the UE and the application device may exchange credentials, and may establish the secure session between the UE and the application device after validating the credentials. The credentials may be received via a user interface of the UE, or may be provided to the UE by another device.

DETAILED DESCRIPTION OF PREFERRED EMBODIMENTS

The following detailed description of example implementations refers to the accompanying drawings. The same reference numbers in different drawings may identify the same or similar elements.

A UE (e.g., a mobile phone, an Internet of Things (IoT) device, a machine to machine (M2M) communication device, etc.) may run an application. The application may provide information to an application device via an LTE network. The connection between the UE and the LTE network may be secure (e.g., may be protected by a secure session, such as a secure hypertext transfer protocol (HTTPS) session). However, in some cases, the connection between the LTE network and the application device may not be secure. In such cases, the UE may establish a secure session with the application device. For example, a user of the UE may input, to the UE, a credential (e.g., a username, a password, etc.), which the application device may validate. Based on validating the credential, the UE and the application device may establish a secure session. As another example, an administrator may provide a credential to the UE (e.g., periodically, on demand, etc.), and the UE may provide the credential to the application device to establish the session.

However, for certain types of UEs, such as IoT UEs, M2M UEs, or the like, inputting the credential to the UE may not be feasible, due to a lack of a user interface at the UE and/or due to no user being present at the UE to input the credential. Further, as a quantity of deployed IoT/M2M UEs continues to increase, periodically updating the credential at the UE may prove impractical.

Implementations described herein permit a relay device to provide a secure session between the LTE network and the application device without requiring the UE to locally store a credential. The UE may upload/download data via the secure session between the LTE network and the application device based on the relay device, or another device, detecting that the UE is associated with the application. In this way, the relay device reduces processor and storage usage at the UE by eliminating the need for the credential to be inputted or stored at the UE. Further, the relay device improves network security by providing a secure data upload/download service via which IoT/M2M UEs may communicate with an application device.

Figure 1A:
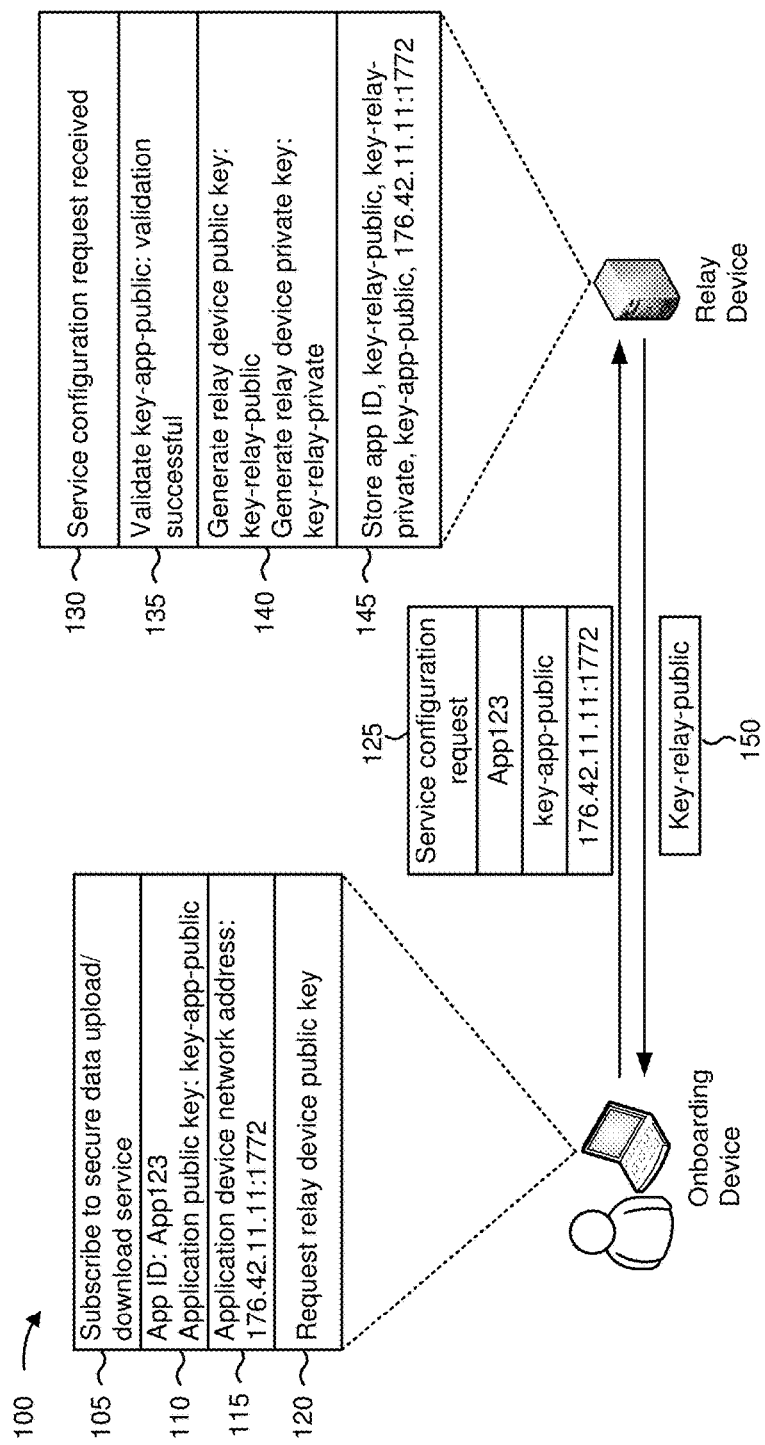
FIGS. 1A-1D are diagrams of an overview of an example implementation described herein.

FIGS. 1A-1D are diagrams of an overview of an example implementation 100 described herein. As shown in FIG. 1A, and by reference number 105, an onboarding device may subscribe to a secure data upload/download service. As shown by reference number 110, the onboarding device may receive an application identifier of App123, and may determine an application public key of key-app-public. As shown by reference number 115, the onboarding device may determine an application device network address (e.g., an IP address and network port of 176.42.11.11:1772). As shown by reference number 120, the onboarding device may request a relay device public key.

As shown by reference number 125, to request the relay device public key, the onboarding device may provide a service configuration request to a relay device. As further shown, the service configuration request may include the application identifier of App123, the application public key of key-app-public, and the application device network address. As shown by reference number 130, the relay device may receive the service configuration request. As shown by reference number 135, the relay device may validate the application public key. For example, the relay device may validate the application public key based on a digital certificate received in association with the application public key.

As shown by reference number 140, the relay device may generate a relay device public/private key pair that includes a relay device public key (e.g., key-relay-public) and a relay device private key (e.g., key-relay-private). As shown by reference number 145, the relay device may store the application identifier, the relay device public key, the relay device private key, the application public key, and the application device network address. As shown by reference number 150, the relay device may provide the relay device public key to the onboarding device.

Figure 1B:
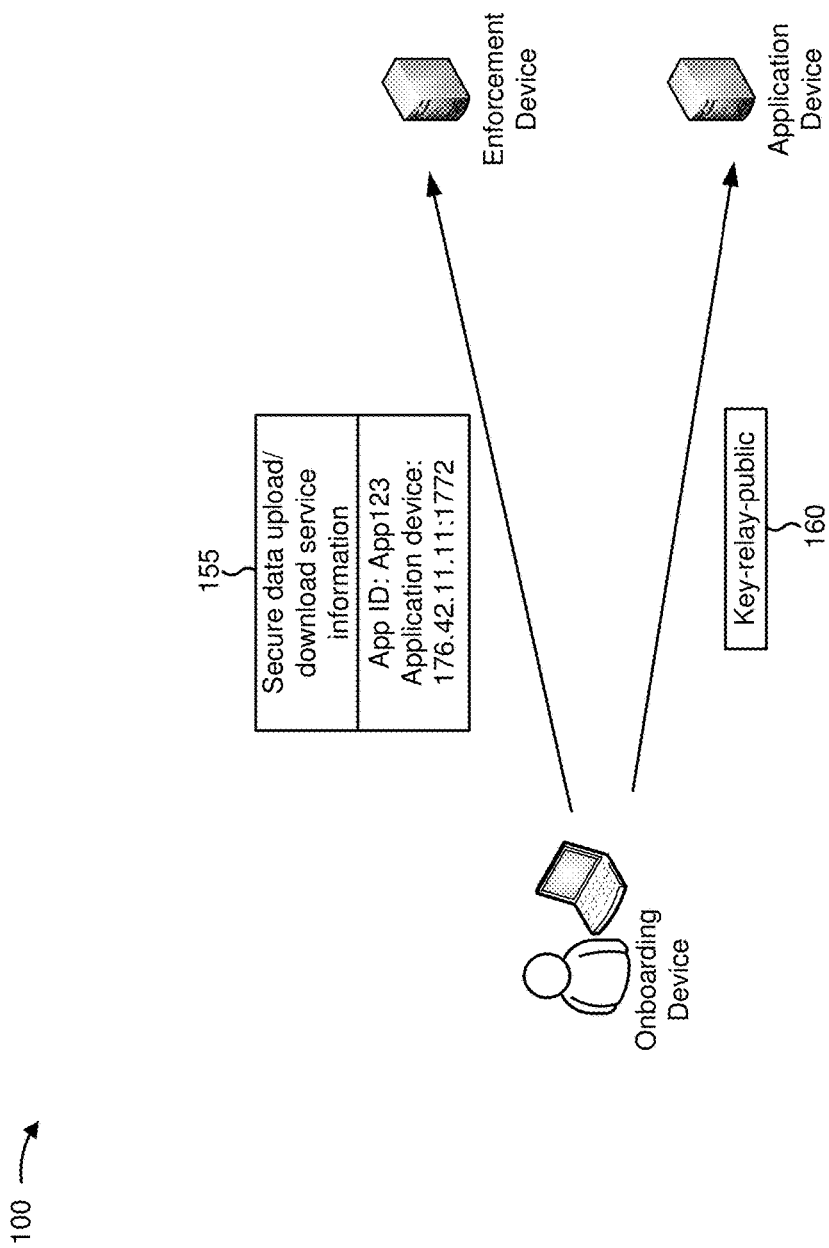

As shown in FIG. 1B, and by reference number 155, the onboarding device may provide secure data upload/download service information to an enforcement device. As further shown, the secure data upload/download service information may include the application identifier and the application device network address. As shown by reference number 160, the onboarding device may provide the relay device public key to the application device.

Figure 1C:
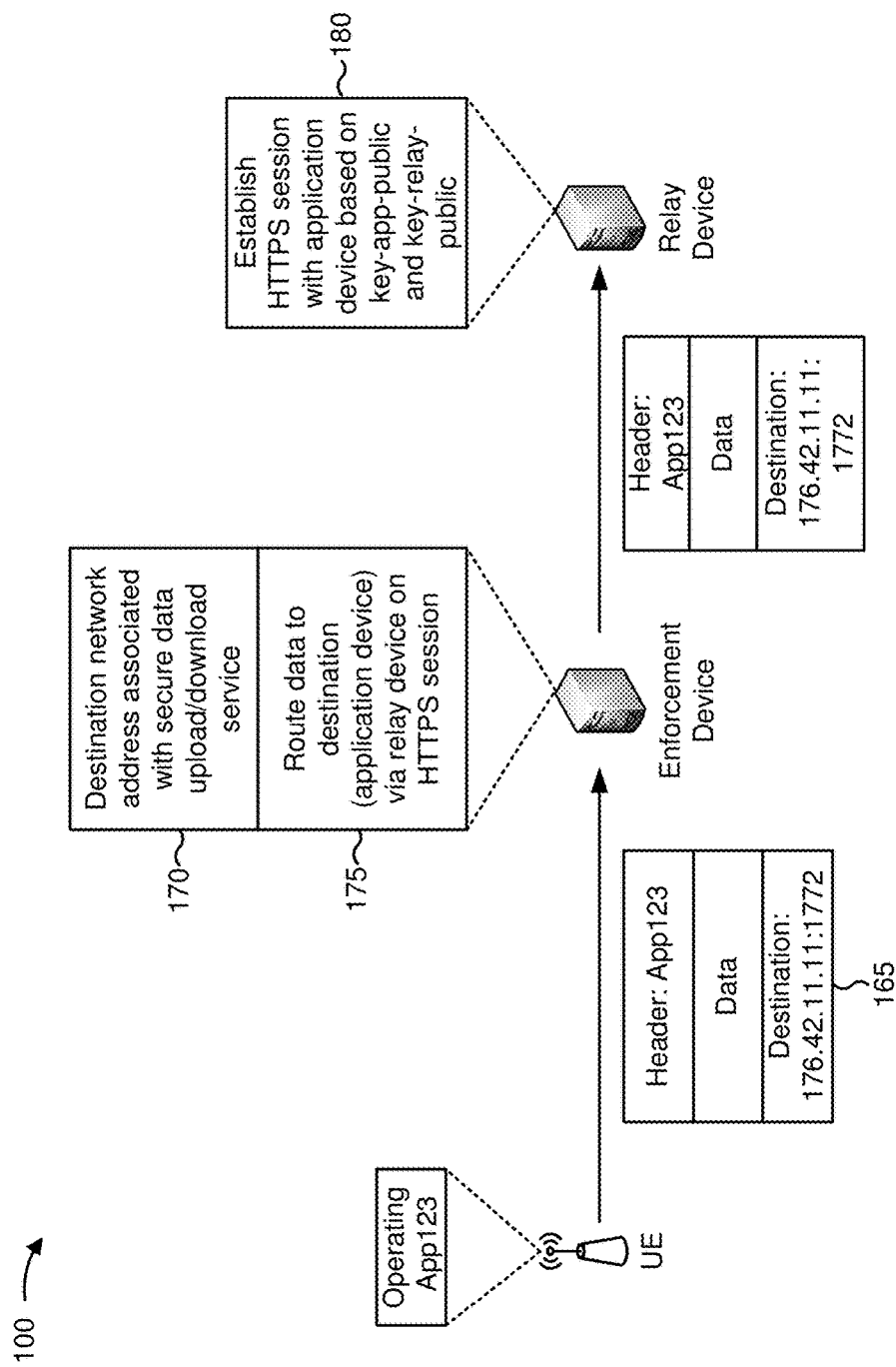

As shown in FIG. 1C, a UE (e.g., an IoT UE, an M2M UE, etc.) may operate an application associated with the application identifier of App123. As shown by reference number 165, the UE may provide data to the enforcement device. As further shown, the data may include a header that includes the application identifier and a destination network address (e.g., an IP address and network port of 176.42.11.11:1772, corresponding to the application device). Assume that the enforcement device receives the data.

As shown by reference number 170, the enforcement device may determine that the destination network address is associated with the secure data upload/download service (e.g., based on stored information received from the onboarding server). As shown by reference number 175, based on determining that the destination network address is associated with the secure data upload/download service, the enforcement device may route the data to the application device via the relay device and via a secure session (e.g., a secure hypertext transfer protocol (HTTPS) session). As shown by reference number 180, based on receiving the data, the relay device may establish an HTTPS session with the application device based on the application public key and based on the relay device public key.

Figure 1D:
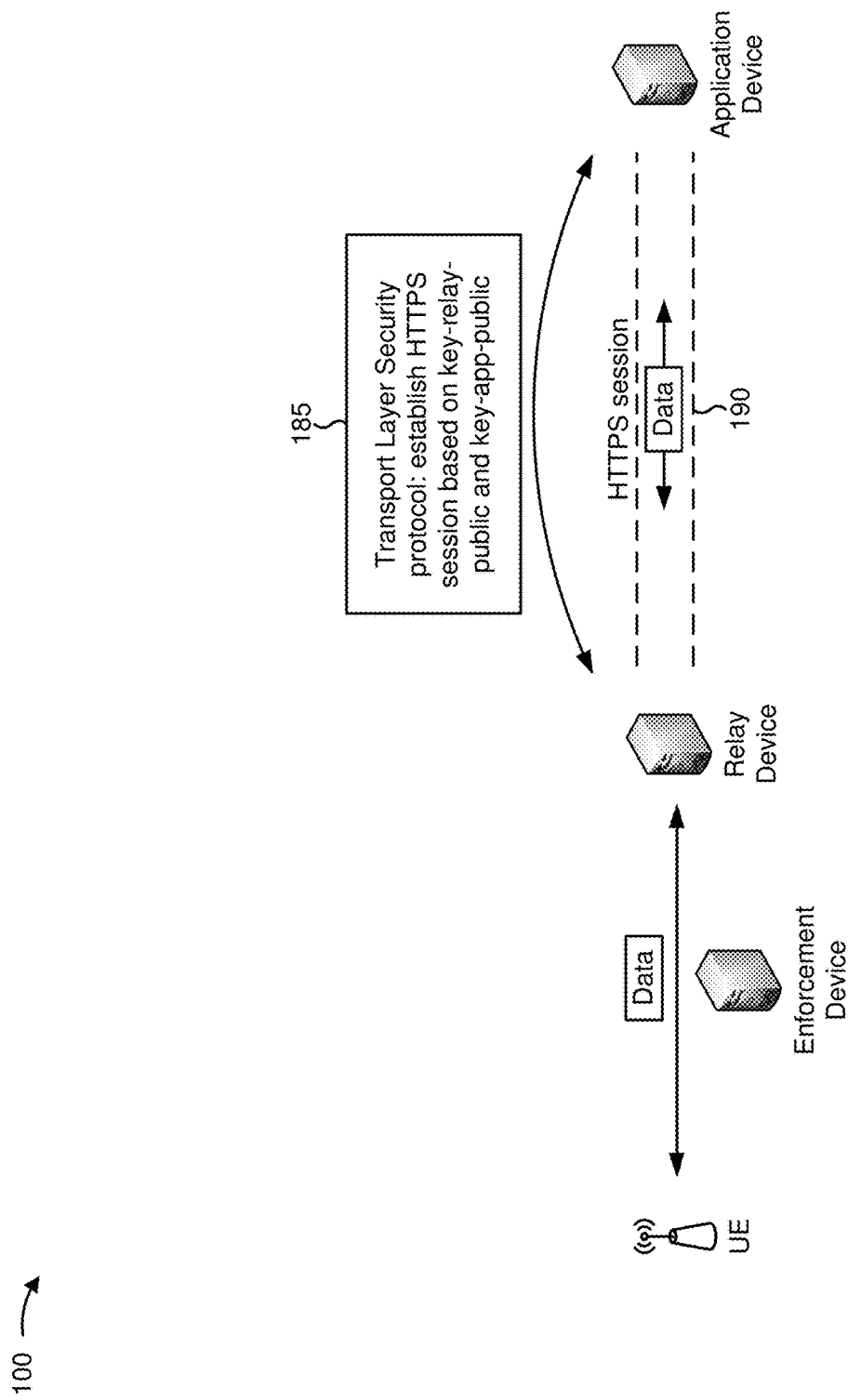

As shown in FIG. 1D, and by reference number 185, in some implementations, the relay device and the application device may establish a secure session (e.g., an HTTPS session) based on a Transport Layer Security protocol. As further shown, the relay device and the application device may establish the HTTPS session based on the application public key and the relay device public key. For example, the relay device and the application device may determine to trust each other based on digital certificates associated with the relay device public key and the application public key, and may negotiate a shared key and/or a secure session based on the relay device public key and the application public key.

As shown by reference number 190, the relay device may provide the data to the application device via the HTTPS session. As further shown, in some cases, the application device may provide data to the UE via the secure session (e.g., via the relay device and the enforcement device). In this way, the relay device establishes a secure session, and reduces processor and storage usage at the UE by eliminating a need for a credential to be inputted or stored at the UE to establish the secure session. Further, the relay device improves network security by providing a secure data upload/download service via which UEs may communicate with an application device.

As indicated above, FIGS. 1A-1D are provided merely as examples. Other examples are possible and may differ from what was described with regard to FIGS. 1A-1D.

Figure 2:
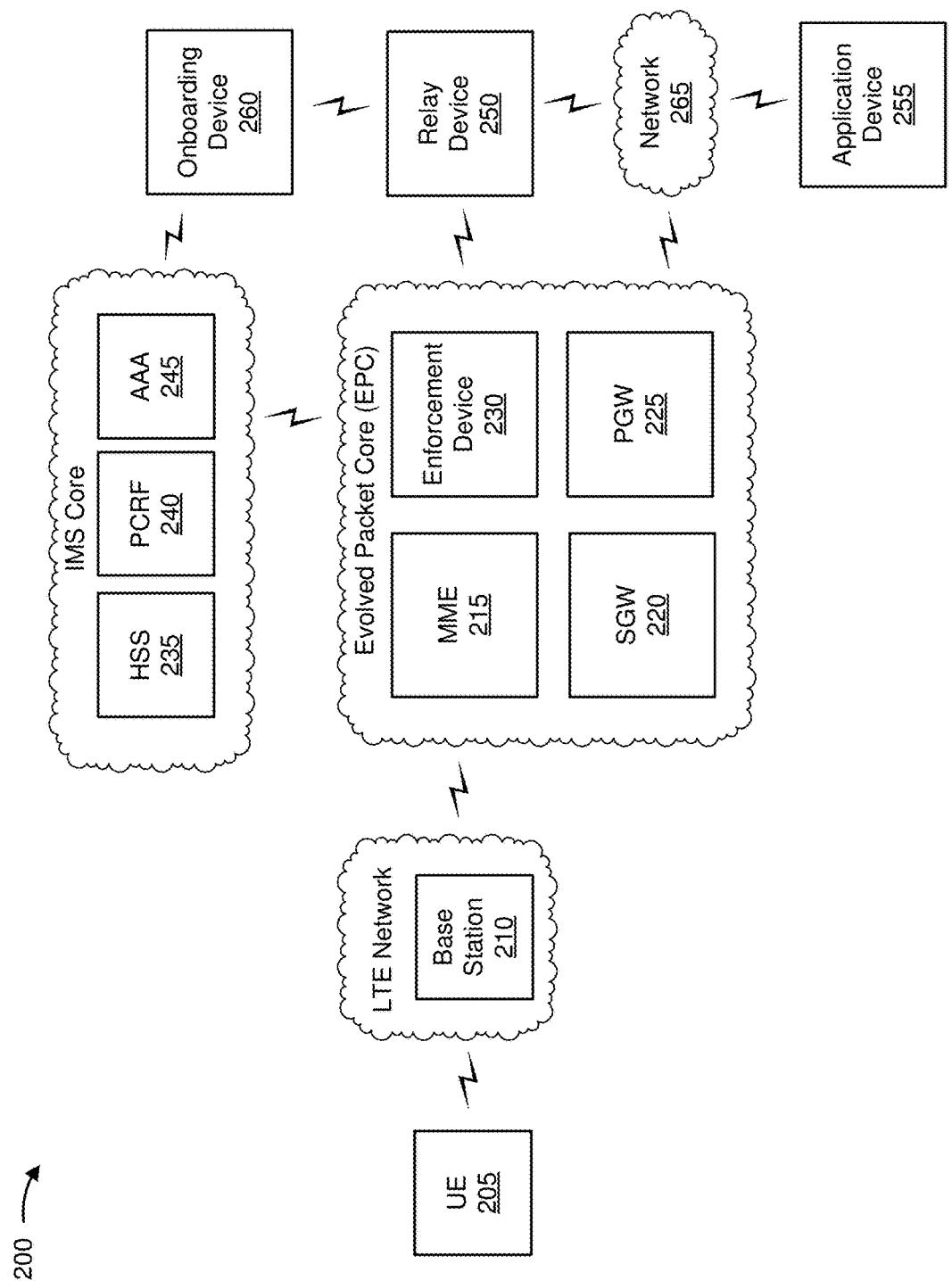
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment (UE) 205; a base station 210; a mobility management entity device (MME) 215; a serving gateway (SGW) 220; a packet data network gateway (PGW) 225; an enforcement device 230; a home subscriber server (HSS) 235; a policy charging and rules function (PCRF) 240; an authentication, authorization, and accounting server (AAA) 245; a relay device 250; an application device 255; an onboarding device 260; and a network 265. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which UE 205 communicates with the EPC. The EPC may include MME 215, SGW 220, PGW 225, and/or PCRF 240 that enable UE 205 to communicate with network 265 and/or an Internet protocol (IP) multimedia subsystem (IMS) core. The IMS core may include HSS 235, PCRF 240, and/or AAA 245, and may manage device registration and authentication, session initiation, billing, etc., associated with UEs 205. HSS 235 and/or PCRF 240 may reside in the EPC and/or the IMS core.

UE 205 may include one or more devices capable of communicating with base station 210. For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a wireless sensor, a wireless measurement device, a remote control device, a smart grid device, an Internet of Things (IoT) device, a machine to machine communication (M2M) device, and/or a similar device. UE 205 may send traffic to and/or receive traffic from network 265 via base station 210.

Base station 210 may include one or more devices capable of transferring traffic, such as audio, video, text, and/or other traffic, destined for and/or received from UE 205. In some implementations, base station 210 may include an eNB associated with the LTE network that receives traffic from and/or sends traffic to network 265 via SGW 220 and/or PGW 225. Additionally, or alternatively, one or more base stations 210 may be associated with a RAN that is not associated with an LTE network. Base station 210 may send traffic to and/or receive traffic from UE 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with UE 205. In some implementations, MME 215 may perform operations relating to authentication of UE 205. Additionally, or alternatively, MME 215 may facilitate the selection of a particular SGW 220 and/or a particular PGW 225 to serve traffic to and/or from UE 205. MME 215 may perform operations associated with handing off UE 205 from a first base station 210 to a second base station 210 when UE 205 is transitioning from a first cell associated with the first base station 210 to a second cell associated with the second base station 210. Additionally, or alternatively, MME 215 may select another MME (not pictured), to which UE 205 should be handed off (e.g., when UE 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 220 may aggregate traffic received from one or more base stations 210 associated with the LTE network, and may send the aggregated traffic to network 265 (e.g., via PGW 225) and/or other network devices associated with the EPC and/or the IMS core. SGW 220 may also receive traffic from network 265 and/or other network devices, and may send the received traffic to UE 205 via base station 210. Additionally, or alternatively, SGW 220 may perform operations associated with handing off UE 205 to and/or from an LTE network.

PGW 225 may include one or more devices capable of providing connectivity for UE 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 265. Additionally, or alternatively, PGW 225 may receive traffic from network 265, and may send the traffic to UE 205 via SGW 220 and base station 210. PGW 225 may record data usage information (e.g., byte usage), and may provide the data usage information to HSS 235.

Enforcement device 230 may include one or more devices capable of receiving, generating, storing, processing, and/or providing information. For example, enforcement device 230 may include a server, a network device (e.g., a router, a firewall, a gateway, a switch, a hub, etc.), or a similar device. Enforcement device 230 may receive information from and/or provide information to one or more devices of environment 200.

HSS 235 may include one or more devices, such as one or more server devices, capable of managing (e.g., receiving, generating, storing, processing, and/or providing) information associated with UE 205. For example, HSS 235 may manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

PCRF 240 may include one or more network devices, or other types of communication devices. PCRF 240 may store subscriber information, such as voice call and data rate plans or quotas for subscribers. PCRF 240 may provide network control regarding service data flow detection, gating, QoS, and/or flow-based charging. Policies and rules regarding QoS may include policies and rules instructing UE 205 and/or network elements (base station 210, MME 215, SGW 220, PGW 225, etc.) to minimize packet loss, to implement a packet delay budget, to provide a guaranteed bit rate (GBR), to provide a particular latency, to reduce RF signal congestion, and/or to perform other activities associated with QoS. PCRF 240 may provide policies and rules to other network devices, such as base station 210, SGW 220, PGW 225, or the like, to implement network control. PCRF 240 may determine how a certain service data flow shall be treated, and may ensure that user plane traffic mapping and QoS is in accordance with a user's profile and/or network policies.

AAA 245 may include one or more devices that perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, RF access signaling usage restrictions, etc.), may track resources consumed by UE 205 (e.g., a quantity of voice minutes consumed, a quantity of data consumed, a quantity of RF signals transmitted, a quantity of radio access bearers requested and/or established, etc.), and/or may perform similar operations.

Relay device 250 may include one or more devices capable of receiving, generating, storing, processing, and/or providing information. For example, relay device 250 may include a server, a network device (e.g., a router, a firewall, a gateway, a switch, a hub, etc.), or a similar device. Relay device 250 may receive information from and/or provide information to one or more devices of environment 200.

Application device 255 may include one or more devices capable of receiving, generating, storing, processing, and/or providing information. For example, application device 255 may include a communication and computing device, such as a smart phone, a laptop computer, a tablet computer, a desktop computer, a server, or a similar device. Application device 255 may receive information from and/or provide information one or more devices of environment 200.

Onboarding device 260 may include one or more devices capable of receiving, generating, storing, processing, and/or providing information. For example, onboarding device 260 may include a communication and computing device, such as a smart phone, a laptop computer, a tablet computer, a desktop computer, a server, or a similar device. Onboarding device 260 may receive information from and/or provide information one or more devices of environment 200.

Network 265 may include one or more wired and/or wireless networks. For example, network 265 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
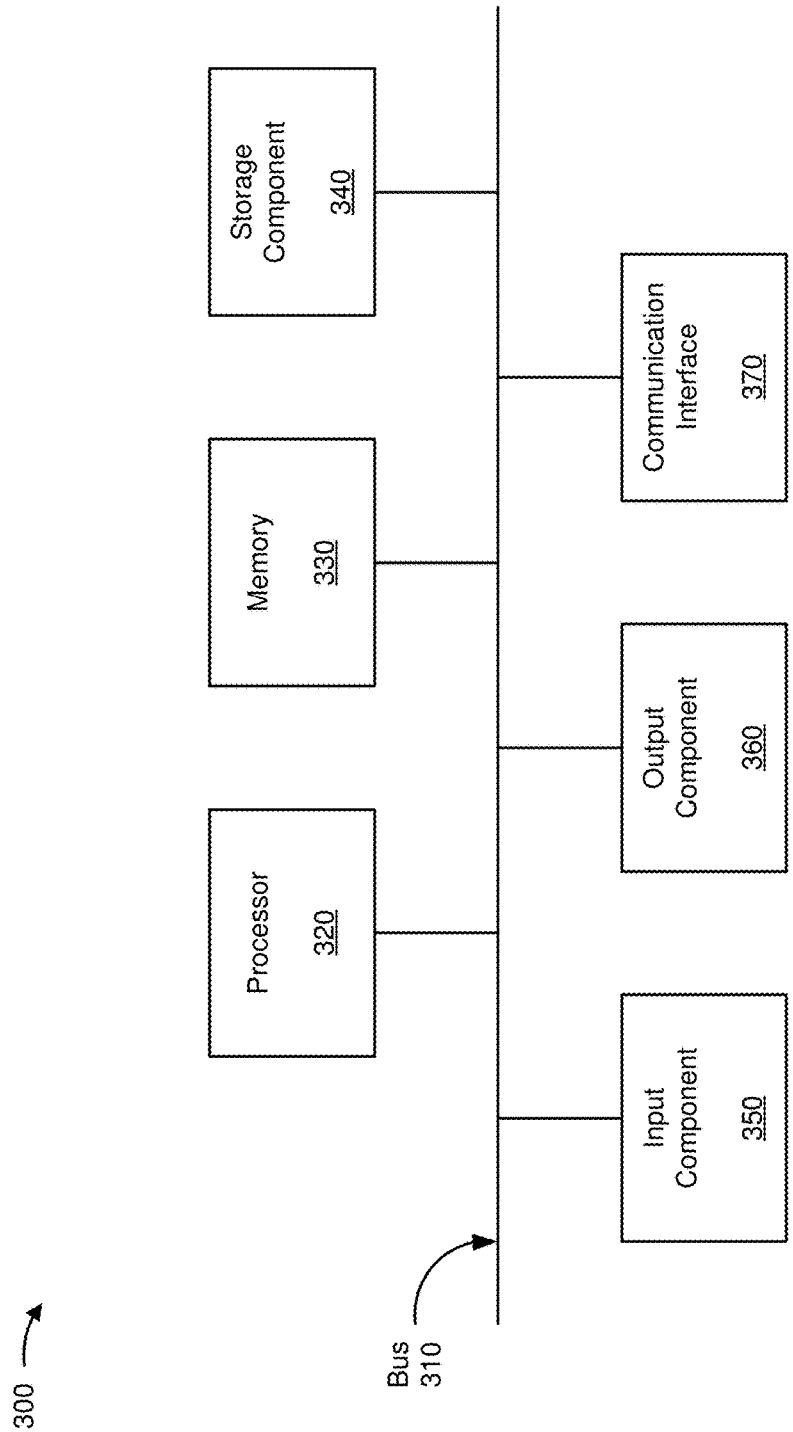
FIG. 3 is a diagram of example components of one or more devices of FIG. 2.

FIG. 3 is a diagram of example components of a device 300. Device 300 may correspond to UE 205, base station 210, MME 215, SGW 220, PGW 225, enforcement device 230, HSS 235, PCRF 240, AAA 245, relay device 250, application device 255, and/or onboarding device 260. In some implementations, UE 205, base station 210, MME 215, SGW 220, PGW 225, enforcement device 230, HSS 235, PCRF 240, AAA 245, relay device 250, application device 255, and/or onboarding device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
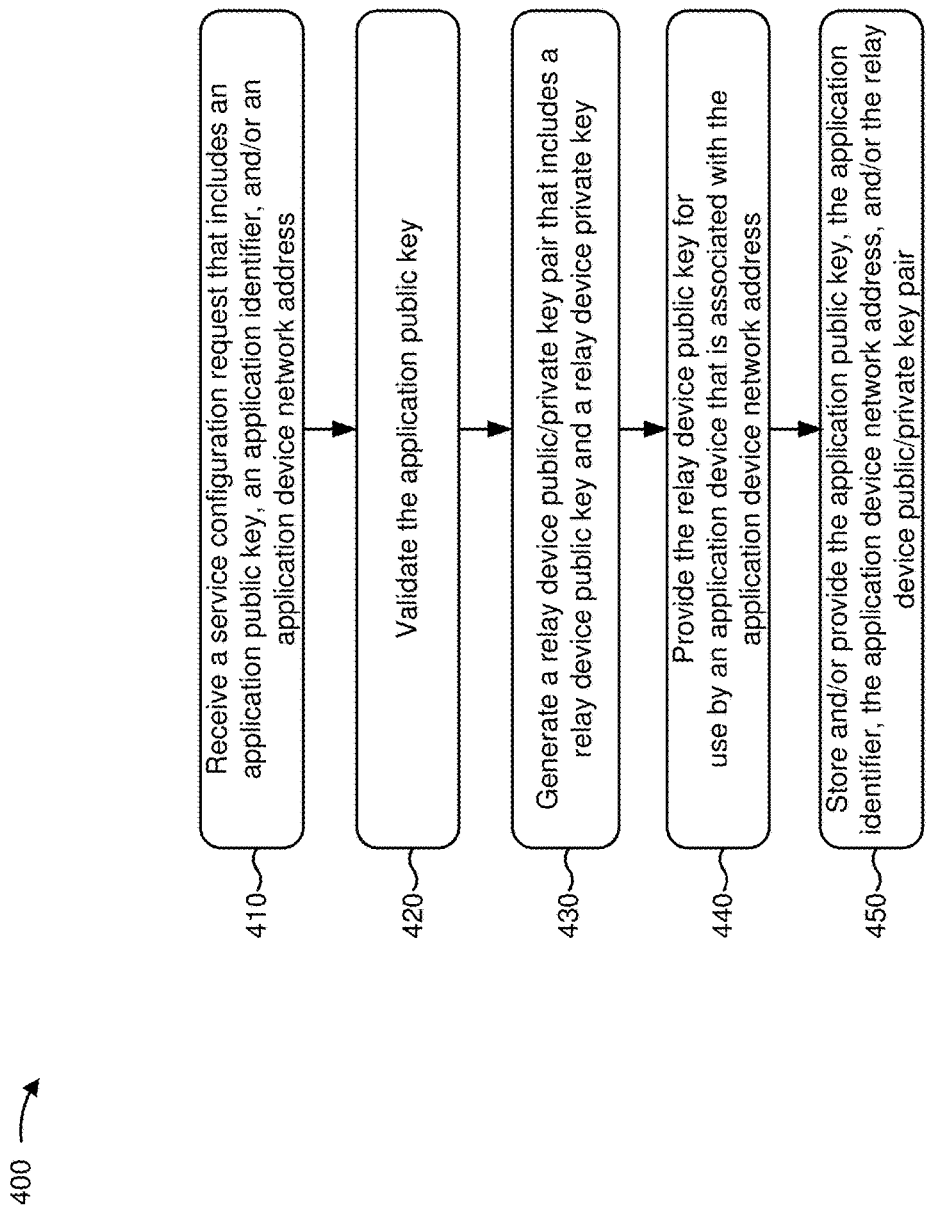
FIG. 4 is a flow chart of an example process for configuring a secure data upload/download service.

FIG. 4 is a flow chart of an example process 400 for configuring a secure data upload/download service. In some implementations, one or more process blocks of FIG. 4 may be performed by relay device 250. In some implementations, one or more process blocks of FIG. 4 may be performed by another device or a group of devices separate from or including relay device 250, such as UE 205, base station 210, MME 215, SGW 220, PGW 225, enforcement device 230, HSS 235, PCRF 240, AAA 245, application device 255, and onboarding device 260.

As shown in FIG. 4, process 400 may include receiving a service configuration request that includes an application public key, an application identifier, and/or an application device network address (block 410). For example, relay device 250 may receive a service configuration request to configure a secure data upload/download service. Relay device 250 may receive the service configuration request from onboarding device 260, or another device. A user associated with the application (e.g., an administrator, a network engineer, etc.) may input information for the service configuration request to onboarding device 260, in some implementations. Additionally, or alternatively, onboarding device 260 may generate information for the service configuration request (e.g., the application public key and/or the application identifier).

The service configuration request may include an application identifier, an application device network address, and/or an application public key. The application identifier may include a string of one or more characters that identifies an application to be run by one or more UEs 205. In some implementations, the application identifier may be unique (e.g., may not be shared by two or more applications). In some implementations, the application identifier may be generated by relay device 250 (e.g., based on receiving the service configuration request). The application device network address may include a network address associated with application device 255 (e.g., an Internet Protocol (IP) address, a network port, an IP address/network port combination, a Uniform Resource Identifier (URI), a Uniform Resource Locator (URL), etc.).

The application public key may include a cryptographic key for an encryption system (e.g., an asymmetric encryption system, a symmetric encryption system, etc.), based on which other devices may authenticate application device 255. For example, application device 255 may store an application private key counterpart to the application public key. Application device 255 may provide the application public key to another device. The other device may generate an encrypted message based on the application public key, and may provide the encrypted message to application device 255. Application device 255 may decrypt the message based on the application private key, and may thereby determine that the other device is to be trusted. For example, the message may contain a shared key to use for communications between application device 255 and the other device, may contain a particular flag indicating that the other device is to be trusted, or the like. Additionally, or alternatively, application device 255 may encrypt a message based on the application private key, and may provide the encrypted message to another device that holds the application public key. The other device may decrypt the message using the application public key.

As further shown in FIG. 4, process 400 may include validating the application public key (block 420). For example, relay device 250 may validate the application public key to determine whether the application public key is valid and/or whether the application public key originates from onboarding device 260. In some implementations, relay device 250 may validate the application public key based on information associated with the application public key. For example, onboarding device 260 may provide a digital certificate in association with the application public key. The digital certificate may identify onboarding device 260, and may include a digital signature from an entity that has verified that the contents of the digital certificate are valid. In this way, relay device 250 validates the application public key, which improves network security.

As further shown in FIG. 4, process 400 may include generating a relay device public/private key pair that includes a relay device public key and a relay device private key (block 430). For example, relay device 250 may generate a relay device public/private key pair. The relay device public/private key pair may include a relay device public key and a relay device private key. Based on the relay device public key and/or the relay device private key, relay device 250 may communicate securely with another device (e.g., application device 255, etc.), as described in more detail below.

In some implementations, relay device 250 may generate and/or store multiple relay device public/private key pairs, and may assign a particular relay device public/private key pair to the secure data upload/download service based on the service configuration request. For example, relay device 250 may generate relay device public/private key pairs periodically, based on a quantity of stored relay device public/private key pairs, or the like. As another example, relay device 250 may receive the relay device public/private key pairs from another device that generates the relay device public/private key pairs, and may store the relay device public/private key pairs. Relay device 250 may assign one of the relay device public/private key pairs to the secure data upload/download service based on the service configuration request. In this way, relay device 250 conserves processor power by storing relay device public/private key pairs for later use.

As further shown in FIG. 4, process 400 may include providing the relay device public key for use by an application device that is associated with the application device network address (block 440). For example, relay device 250 may provide the relay device public key for use by application device 255. In some implementations, relay device 250 may provide the relay device public key to application device 255. Additionally, or alternatively, relay device 250 may provide the relay device public key to another device (e.g., onboarding device 260, etc.), and the other device may provide the relay device public key to application device 255. Application device 255 may use the relay device public key to establish a secure session with relay device 250, as described in more detail in connection with FIG. 6, below.

As further shown in FIG. 4, process 400 may include storing and/or providing the application public key, the application identifier, the application device network address, and/or the relay device public/private key pair (block 450). For example, relay device 250 may store and/or provide the application public key, the application identifier, the application device network address, and/or the relay device public/private key pair. In some implementations, relay device 250 may provide information to enforcement device 230. For example, relay device 250 may provide the application identifier and/or the application device network address to enforcement device 230.

Additionally, or alternatively, relay device 250 may provide information to onboarding device 260. For example, relay device 250 may provide the application identifier, the application device network address, and/or the relay device public key to onboarding device 260. Onboarding device 260 may provide the application identifier and/or the application device network address to enforcement device 230, and/or may provide the relay device public key to onboarding device 260. In some implementations, relay device 250 may store information. For example, relay device 250 may store the relay device public/private key pair, the application public key, the application identifier, and/or the application device network address. Relay device 250 may use the application public key and/or the relay device private key to establish a secure session with application device 255, which improves network security.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
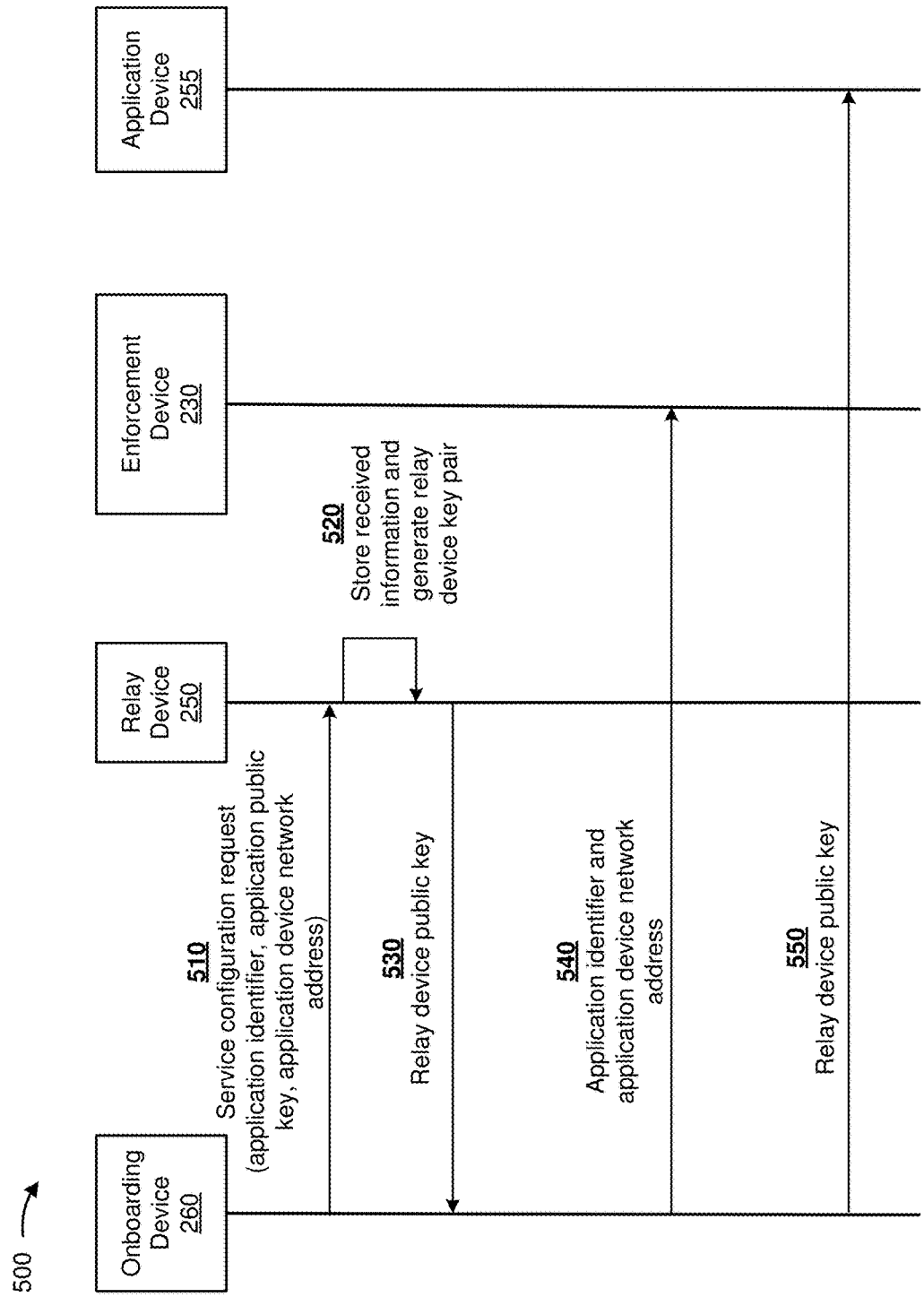
FIG. 5 is a signal diagram of an example implementation relating to the example process shown in FIG. 4.

FIG. 5 is a signal diagram of an example implementation 500 relating to example process 400 shown in FIG. 4. FIG. 5 shows an example of configuring a secure data upload/download service. As shown in FIG. 5, and by reference number 510, onboarding device 260 may provide a service configuration request to relay device 250. As further shown, the service configuration request may include an application identifier, an application public key, and an application device network address. As shown by reference number 520, relay device 250 may store the application identifier, the application public key, and the application device network address. As further shown, relay device 250 may generate a relay device public/private key pair for the secure data upload/download service.

As shown by reference number 530, relay device 250 may provide a relay device public key, of the relay device public/private key pair, to onboarding device 260. As shown by reference number 540, onboarding device 260 may provide the application identifier and the application device network address to enforcement device 230. As shown by reference number 550, onboarding device 260 may provide the relay device public key to application device 255.

As indicated above, FIG. 5 is provided merely as an example. Other examples are possible and may differ from what was described with regard to FIG. 5.

Figure 6:
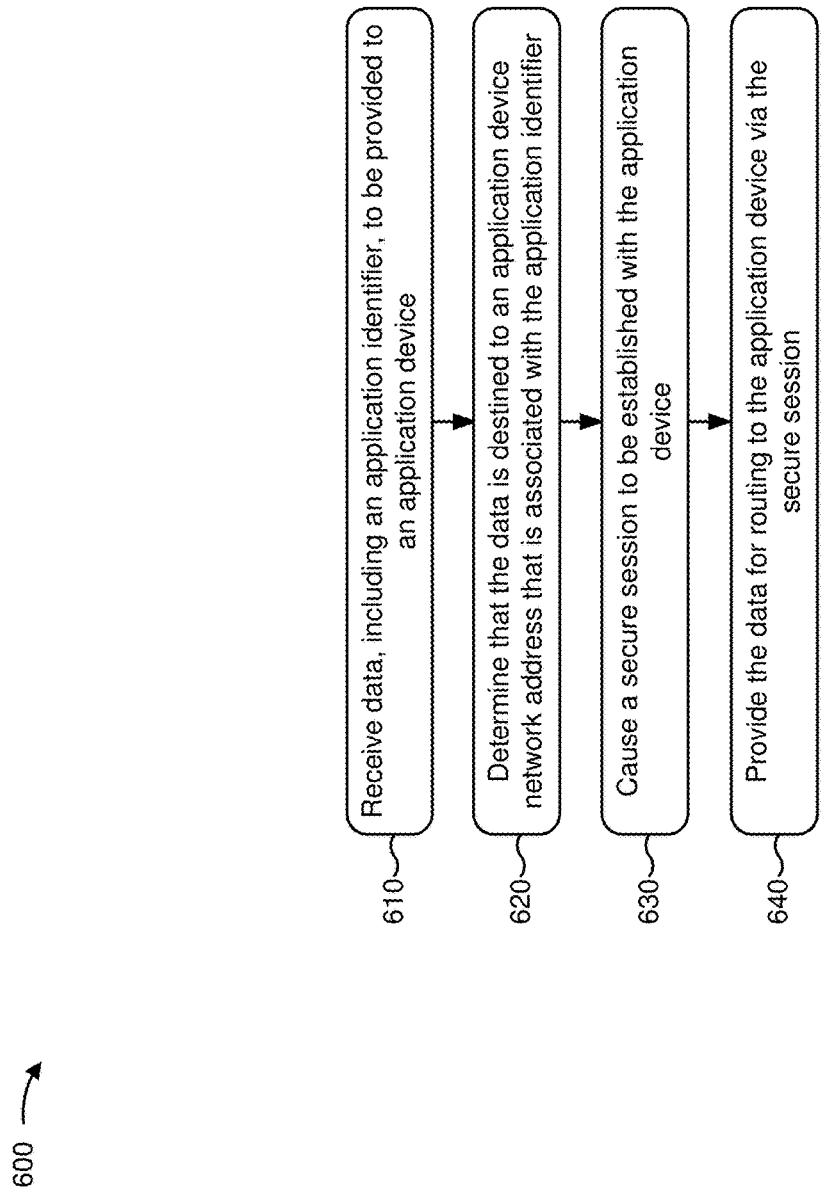
FIG. 6 is a flow chart of an example process for providing data via a secure data upload/download service.

FIG. 6 is a flow chart of an example process 600 for providing data via a secure data upload/download service. In some implementations, one or more process blocks of FIG. 6 may be performed by relay device 250. In some implementations, one or more process blocks of FIG. 6 may be performed by another device or a group of devices separate from or including relay device 250, such as UE 205, base station 210, MME 215, SGW 220, PGW 225, enforcement device 230, HSS 235, PCRF 240, AAA 245, application device 255, and onboarding device 260.

As shown in FIG. 6, process 600 may include receiving data, including an application identifier, to be provided to an application device (block 610). For example, relay device 250 may receive data, including an application identifier. In some implementations, the application identifier may be included in the data. Additionally, or alternatively, the data may be a payload of a packet that includes the application identifier as a header of the packet. Relay device 250 may receive the data as the data is en route to application device 255. For example, the data may include a destination network address that matches an application device network address of application device 255.

In some implementations, relay device 250 may receive the data via enforcement device 230. For example, enforcement device 230 may store a data structure (e.g., a database, an array, etc.) identifying application identifiers and application device network addresses that are associated with secure data upload/download services. Enforcement device 230 may receive the data from UE 205, and may determine that the data is en route to application device 255. For example, enforcement device 230 may detect the application identifier and the application device network address, and may determine that the application identifier and the application device network address are identified in the data structure. Based on the application identifier and the application device network address being identified in the data structure, enforcement device 230 may route the data to relay device 250.

In a situation where the application identifier and/or the application device network address are not stored in the data structure, enforcement device 230 may route the data, to be provided to application device 255, to another device and/or in another fashion (e.g., to PGW 225, to be provided via an unsecured session, etc.). In this way, enforcement device 230 may selectively route data based on whether the data is associated with a secure data upload/download service, which conserves network resource that may otherwise be used to establish secure sessions with application device 255.

As further shown in FIG. 6, process 600 may include determining that the data is destined to an application device network address that is associated with the application identifier (block 620). For example, relay device 250 may determine that the data is destined to an application device network address that is associated with the application identifier. In some implementations, relay device 250 may store information associating application identifiers, application device network addresses, and secure data upload/download services.

Relay device 250 may determine that an application identifier and a destination network address for the data are associated with a secure data upload/download service. In some implementations, relay device 250 may determine that the data is associated with the secure data upload/download service based on receiving the data from enforcement device 230. For example, enforcement device 230 may route data that is associated with a secure data upload/download service to relay device 250, and may route data that is not associated with a secure data upload/download service to another device (e.g., PGW 225, etc.).

As further shown in FIG. 6, process 600 may include causing a secure session to be established with the application device (block 630). For example, relay device 250 may cause a secure session to be established with application device 255. In some implementations, relay device 250 may cause the secure session to be established based on a public key. For example, relay device 250 may store an application public key, and application device 255 may store a relay device public key. Based on the application public key and the relay device public key, relay device 250 and application device 255 may establish a secure session (e.g., an HTTPS session, etc.). In some implementations, relay device 250 may determine that a secure session with application device 255 has previously been established. In such cases, relay device 250 may provide the data via the previously established secure session, which conserves processor resources that may otherwise be used to reestablish the secure session.

In some implementations, relay device 250 may establish the secure session with application device 255 based on a transport layer security (TLS) protocol. For example, relay device 250 may transmit a message including a list of available encryption algorithms, and may receive a response from application device 255 selecting one of the available encryption algorithms. Application device 255 may provide a digital certificate including an application public key. Based on the digital certificate, relay device 250 may validate application device 255, and may provide a shared key to application device 255. In some implementations, relay device 250 may provide a digital certificate that includes the relay device public key to application device 255, and application device 255 may validate relay device 250 based on the digital certificate. Application device 255 and relay device 250 may use the shared key to encrypt communications between application device 255 and relay device 250. In this way, relay device 250 and application device 255 initiate a secure session via which to transmit data, which permits UE 205 to securely transmit data to application device 255 via the LTE network and network 265.

As further shown in FIG. 6, process 600 may include providing the data for routing to the application device via the secure session (block 640). For example, relay device 250 may provide the data for routing to application device 255 via the secure session. In this way, relay device 250 establishes a secure session with an application device 255 that is external to the LTE network and transmits data from UE 205 via the secure session. Thus, relay device 250 improves network security and reduces processor requirements at UE 205 that may otherwise be used to encrypt the data or establish a secure session with application device 255.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
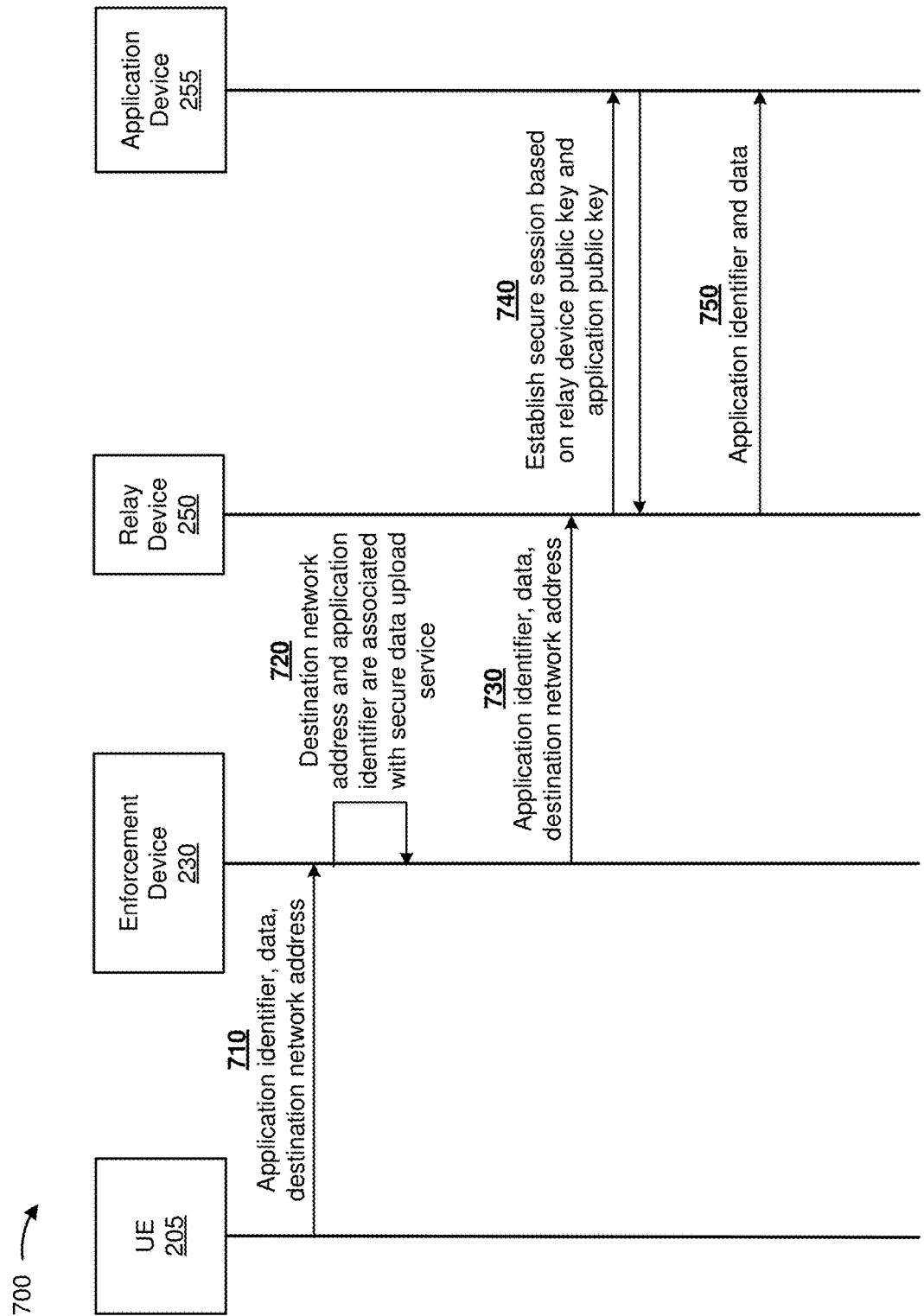
FIG. 7 is a signal diagram of an example implementation relating to the example process shown in FIG. 6.

FIG. 7 is a signal diagram of an example implementation 700 relating to example process 600 shown in FIG. 6. FIG. 7 shows an example of providing data via a secure data upload/download service. As shown in FIG. 7, and by reference number 710, UE 205 may provide an application identifier, data, and a destination network address to enforcement device 230. As shown by reference number 720, enforcement device 230 may determine that the destination network address and the application identifier are associated with a secure data upload/download service. As shown by reference number 730, enforcement device 230 may provide the application identifier, the data, and the destination network address to relay device 250.

As shown by reference number 740, relay device 250 may establish a secure session based on a relay device public key and based on an application public key. As shown by reference number 750, relay device 250 may transmit the application identifier and the data via the secure session.

As indicated above, FIG. 7 is provided merely as an example. Other examples are possible and may differ from what was described with regard to FIG. 7.

In this way, a relay device establishes a secure session to transmit data from a UE to an application device that is not included in the LTE network, which improves network security. By establishing the secure session based on an application identifier and a destination network address, the relay device reduces a quantity of information to be inputted and/or maintained at the UE.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more memories; and
one or more processors, communicatively coupled to the one or more memories, to:
receive data, to be provided to a second device, and an application identifier and a network address of the second device,
the data, the network address of the second device, and the application identifier being received from a third device,
the third device selectively routing data based on whether the data is associated with a secure data session;
the first device being associated with a first network, the second device being associated with a second network,
the first network being a different network than the second network, and
the application identifier being associated with the second device;
determine that the data is destined to the second device based on the network address of the second device and the application identifier and based upon receiving the data associated with the secure data session from the third device;
cause a secure session to be established with the second device,
the secure session allowing the data to be securely transmitted from a fourth device to the second device without requiring the fourth device to input or store an authenticating credential for establishing the secure session, and
the fourth device and second device directly communicating via the secure session; and
provide the data to the second device via the secure session.

2. The first device of claim 1, where
the first device stores information associating the application identifier and the network address.

3. The first device of claim 1, where the one or more processors, when causing the secure session to be established, are to:
generate a cryptographic key;
provide the cryptographic key to the second device; and
establish the secure session based on the cryptographic key.

4. The first device of claim 3, where the cryptographic key is a first cryptographic key; and
where the one or more processors, when causing the secure session to be established, are to:
receive a second cryptographic key,
the second cryptographic key being associated with the second device; and
establish the secure session based on the first cryptographic key and the second cryptographic key.

5. The first device of claim 3, where the one or more processors, when establishing the secure session, are to:
establish the secure session based on a Transport Layer Security protocol.

6. The first device of claim 1, where the data is first data; and
where the one or more processors are further to:
receive second data via the secure session; and
provide the second data to the third device.

7. The first device of claim 1, where the data is first data; and where the one or more processors are to:
receive second data to be provided to the second device;
determine that the secure session has been established; and
provide the second data to the second device via the secure session.

8. A non-transitory computer-readable medium storing instructions, the instructions comprising:
one or more instructions that, when executed by one or more processors of a first device, cause the one or more processors to:
receive data, via a first network, to be provided to a second device, and an application identifier and a network address of the second device,
the data, the network address of the second device, and the application identifier being received from a third device,
the third device selectively routing data based on whether the data is associated with a secure data session,
the first device being associated with the first network,
the second device being associated with a second network,
the first network being a different network than the second network, and
the application identifier being associated with the second device;
determine that the data is destined to the second device based on the network address of the second device and the application identifier and based upon receiving the data associated with the secure data session from the third device;
establish a secure session between the first device and the second device,
the secure session allowing the data to be securely transmitted from a fourth device to the second device without requiring the fourth device to input or store an authenticating credential for establishing the secure session, and
the fourth device and second device directly communicating via the secure session; and
provide the data to the second device via the secure session.

9. The non-transitory computer-readable medium of claim 8, where the one or more instructions, that cause the one or more processors to establish the secure session, cause the one or more processors to:
generate a cryptographic key;
provide the cryptographic key to the second device; and
establish the secure session based on the cryptographic key.

10. The non-transitory computer-readable medium of claim 9, where the one or more instructions, when executed by the one or more processors, cause the one or more processors to:
generate the cryptographic key based on receiving the network address of the second device and the application identifier; and
provide the cryptographic key to the third device,
the third device providing the cryptographic key to the second device.

11. The non-transitory computer-readable medium of claim 9, where the one or more instructions, that cause the one or more processors to generate the cryptographic key, cause the one or more processors to:
generate a public key and a private key; and
locally store the private key; and
where the one or more instructions, that cause the one or more processors to provide the cryptographic key, cause the one or more processors to:
provide the public key to the second device.

12. The non-transitory computer-readable medium of claim 8, where the first network comprises a Long Term Evolution network and where the second network comprises the Internet; and
where the third device is an Internet of Things device or a Machine to Machine communication device.

13. The non-transitory computer-readable medium of claim 8, where the one or more instructions, that cause the one or more processors to determine that the data is destined to the second device, cause the one or more processors to:
determine that the data is destined to the second device based on the network address of the second device,
the first device storing information associating the application identifier and the network address.

14. The non-transitory computer-readable medium of claim 8, where the data is a payload of a packet, and where the application identifier is included in a header of the packet.

15. A method, comprising:
receiving, by a first device, data to be provided to a second device, and an application identifier and a network address of the second device,
the first device being associated with a first network, and
the second device being associated with a second network,
the first network being a different network than the second network, and
the application identifier being associated with the second device, and
the data, the network address of the second device, and the application identifier being received from a third device,
the third device selectively routing data based on whether the data is associated with a secure data session;
determining, by the first device, that the data is destined to the second device and based upon receiving the data associated with the secure data session from the third device;
establishing, by the first device, a secure session with the second device,
the secure session allowing the data to be securely transmitted from a fourth device to the second device without requiring the fourth device to input or store an authenticating credential for establishing the secure session,
the fourth device and second device directly communicating via the secure session; and
providing, by the first device, the data to the second device via the secure session.

16. The method of claim 15, where establishing the secure session comprises:
establishing a secure hypertext transfer protocol session.

17. The method of claim 15, where receiving the data and the application identifier and the network address of the second device comprises:
receiving the data and the application identifier based on the application identifier being associated with the second device.

18. The method of claim 15, where determining that the data is destined to the second device comprises:
   determining that the data is destined to the second device based on the network address of the second device,
      the first device storing information associating the application identifier and the network address.

19. The method of claim 18, where establishing the secure session comprises:
   generating a cryptographic key;
   providing the cryptographic key to the second device; and
   establishing the secure session based on the cryptographic key.

20. The method of claim 18, where the data is first data; and
   where the method further comprises:
      receive second data to be provided to the second device;
      determine that the secure session has been established; and
      provide the second data to the second device via the secure session.

* * * * *